UNITED STATES PATENT OFFICE.

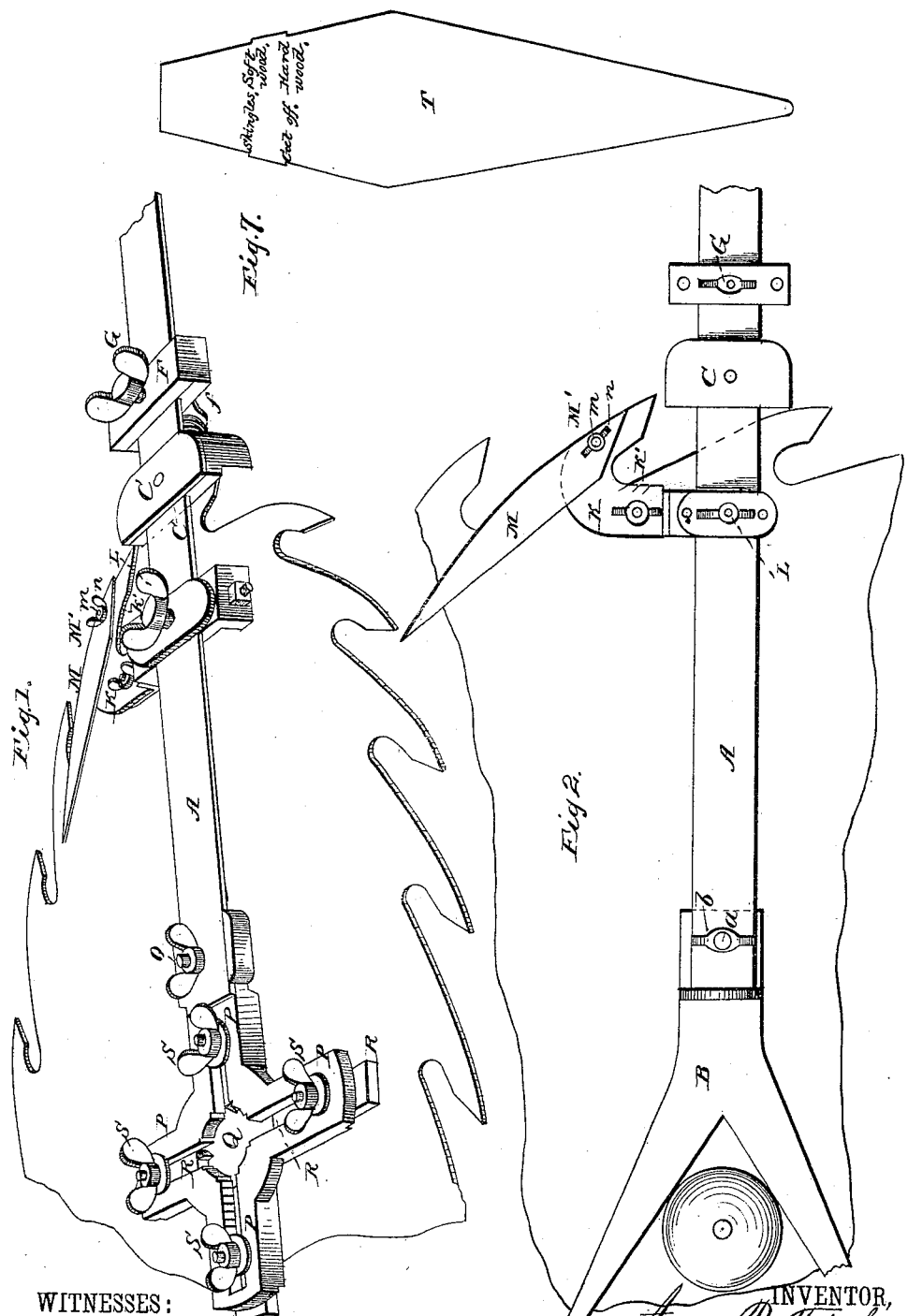

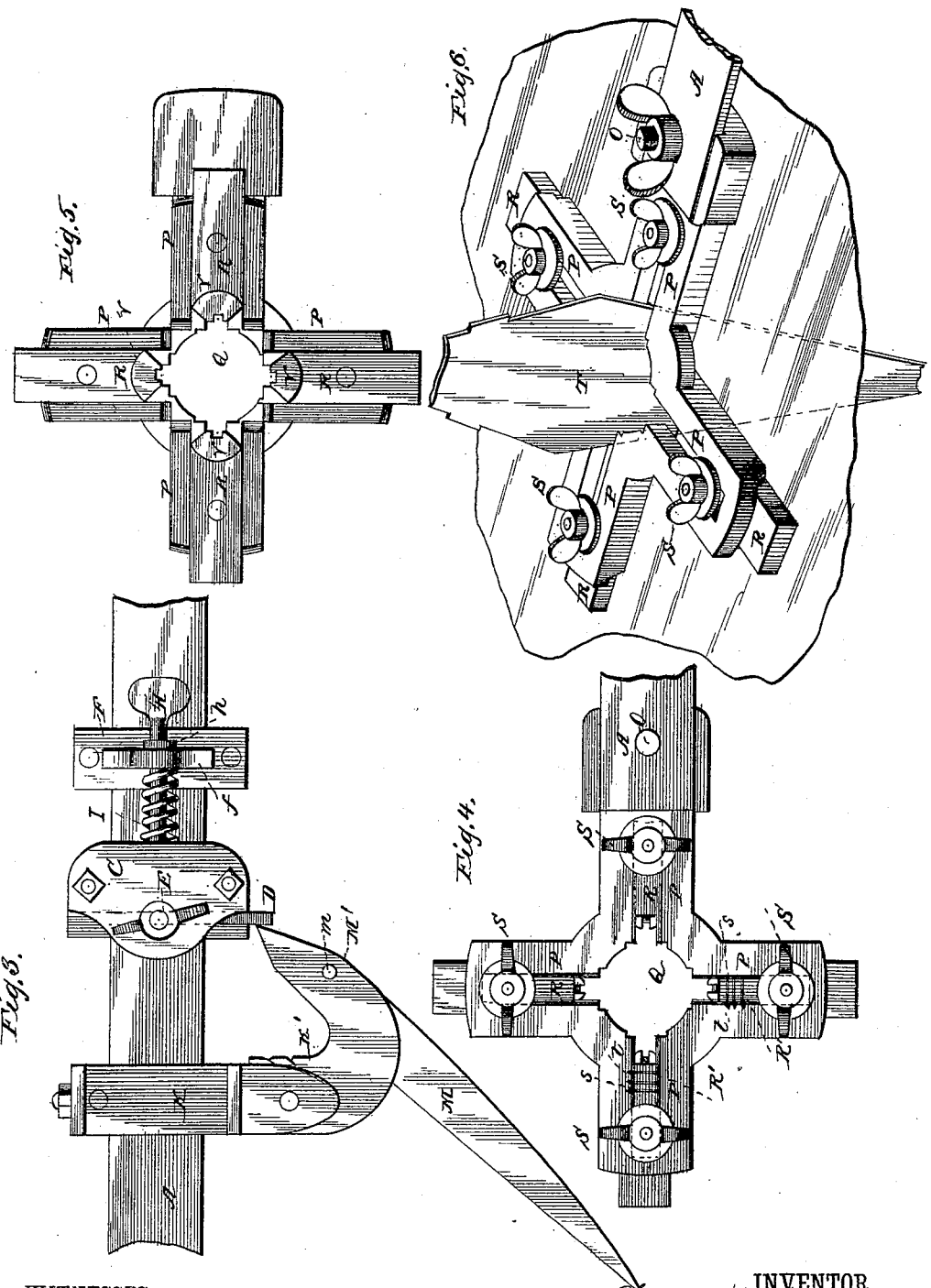

AMOS B. FISHER, OF CARIBOU, MAINE.

DEVICE FOR SQUARING, ROUNDING, AND FILING CIRCULAR SAWS.

SPECIFICATION forming part of Letters Patent No. 269,654, dated December 26, 1882.

Application filed July 25, 1882. (No model.)

*To all whom it may concern:*

Be it known that I, AMOS B. FISHER, of Caribou, in the county of Aroostook and State of Maine, have invented certain new and useful Improvements in Devices for Squaring, Rounding, and Filing Circular Saws; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view, illustrating the operation of my device. Fig. 2 is a top or plan view of the device or apparatus with a portion of a saw. Fig. 3 is a bottom plan view of the outer end of the apparatus, showing the adjustable squaring and rounding file and tooth pattern. Fig. 4 is a detail view of the inner end of the apparatus with its adjustable bearing-block. Fig. 5 is a view of the under side of the bearing-block with its adjustable slides. Fig. 6 is a perspective detail view of the bearing-block or central bushing inserted into the eye of the saw, showing the operation of the expander for adjusting the sliding blocks to their proper position, and Fig. 7 is a plan view of the expander.

Similar letters of reference indicate corresponding parts in all the figures.

My invention has relation to devices for squaring, rounding, and filing the teeth of circular saws; and it consists in the detailed construction and combination of parts, as hereinafter more fully described, of a combined gage, file, and tooth-pattern, adapted by a slight modification in its construction to be used on saws on or off the arbor.

In the accompanying drawings, the letter A represents a flat bar of any suitable length. When the device is to be used to square and file the teeth of a saw on the arbor this bar is provided at its inner end with a bifurcated head, B, attached to it by a screw, a, and thumb-nut b.

C is the file-holder, and D the file, which is clamped in the holder by a binding-screw, E. The file-holder has a slot, c, for the insertion of the bar A, on which it slides.

F is a slotted block, which also slides on bar A, upon which it may be held in any given position by means of a binding-screw, G. Through the projecting lip f of the adjustable block F is inserted a thumb-screw, H, having a collar, h, bearing against lip f, and working with its threaded lower end in the file-holder C. It follows that by loosening the binding-screw G block F and the file-holder C may be slid up or down on bar A, and after block F has been fixed in place upon the bar by its binding-screw the position of the file-holder and file may be further adjusted with great nicety by means of the adjusting-screw H, a spiral spring, I, encircling said screw between the lip f and the file-holder, in which the lower end of the screw works.

K is the tooth-gage and pattern, which is of the shape shown in the drawings, and has a binding-screw, L, for fixing it in its adjusted position on bar A below the file-holder.

M is the movable and adjustable pattern, which is pivoted upon a screw, m, and may be held in its adjusted position upon the fixed pattern K by means of a thumb-nut, n.

In using the device, the bifurcated head B is placed over the saw-arbor, and the file-holder F adjusted in its proper position upon bar A, with its file bearing against the point of the saw-teeth. By now reciprocating bar A the file-holder will move in an arc, having the arbor for its center, and thus squaring the point of the tooth and rounding the tooth, and by in this manner carrying the file-holder and file successively from one tooth to another around the circumference of the saw they all are filed, squared, and rounded exactly to the same size or length.

By adjusting the movable tooth-pattern M the back of the teeth may be filed down successively with a hand-file, using the edge M' as a gage, which insures a perfect and even shape of all the teeth, the points of which are filed down to conform to the inner edge, K', of the fixed pattern K.

Where the saw is to be squared, rounded, and filed, off the arbor, I use the expansion-bushing shown in Figs. 5 and 6 in place of the bifurcated head B, the bushing being fastened to the inner end of bar A by a screw, O, and its appropriate thumb-nut or clamping-nut. This bushing is in the shape of a cross, having four slotted arms, P, and a central circular aperture, Q. In each of the slotted arms works a slide, R, which may be fixed in position by a thumb-nut, S, and has a segmental offset or shoulder, r, at its inner end on the under side. Two of the sliding blocks R' are provided with scales s, and the grooved arms in which they slide are similarly marked t, by means of which the slides so marked may easily be adjusted in the same position. The bushing having been placed in the eye of the saw, and the sealed slides R' R' so adjusted that their segmental shoulders r will bear against the rim of the eye, the wedge-shaped expander T is inserted into the central aperture, Q, of the bushing, successively between opposite pairs of slides R' and R, which are thus forced apart and caused to impinge with their shoulders r against the rim of the eye of the saw, after which they are fixed in position by tightening the nuts S.

If desired, and as a matter of convenience, the expander T may be marked on one or both edges of its upper end, indicating the set of teeth as required for different kinds of wood.

Having thus described my invention, I claim and desire to secure by Letters Patent of the United States—

1. The combination of the bar A, slotted file-holder C, having the file D, and binding-screw E, adjustable slide F, having a binding-screw, G, and thumb-screw H, and spring I, constructed and combined to operate substantially in the manner and for the purpose herein shown and specified.

2. The combination of the bar A and the adjustable hook-shaped tooth-pattern K, having the binding-screw L, and provided with an adjustable extension or pattern, M, and thumb-screw n, substantially as and for the purpose herein shown and described.

3. The bushing consisting of the slotted arms P, having central aperture, Q, and provided with adjustable slides R, having segmental shoulders r, and thumb-nuts S, in combination with the bar A, provided at its outer end with devices for squaring, rounding, and gaging the teeth of a circular saw, substantially as and for the purpose herein shown and set forth.

In testimony that I claim the foregoing as my own I have hereunto affixed my signature in presence of two witnesses.

AMOS BECKWITH FISHER.

Witnesses:
WILLIAM P. ALLEN,
FRANK L. ROBERTS.